C. D. HARRIS.
SLEIGH ATTACHMENT FOR AUTOMOBILES.
APPLICATION FILED NOV. 7, 1913.

1,114,259. Patented Oct. 20, 1914.

WITNESSES

INVENTOR
CLYDE D. HARRIS
BY
ATTORNEY

UNITED STATES PATENT OFFICE.

CLYDE D. HARRIS, OF HELENA, MISSOURI.

SLEIGH ATTACHMENT FOR AUTOMOBILE.

1,114,258.

Specification of Letters Patent.

Patented Oct. 20, 1914.

Application filed November 7, 1913. Serial No. 799,781.

*To all whom it may concern:*

Be it known that I, CLYDE D. HARRIS, a citizen of the United States, residing at Helena, in the county of Andrew and State of Missouri, have invented certain new and useful Improvements in Sleigh Attachments for Automobiles, of which the following is a specification, reference being had to the accompanying drawings.

This invention relates to new and useful improvements in sleigh attachments for automobiles and the like and the primary objects of the invention is to provide a device of this character which may be quickly and readily attached to an automobile, whereby the vehicle may be placed in use when the ground is covered with snow.

A still further object of the invention resides in providing an improved attachment of this character which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and then claimed.

Figure 1:
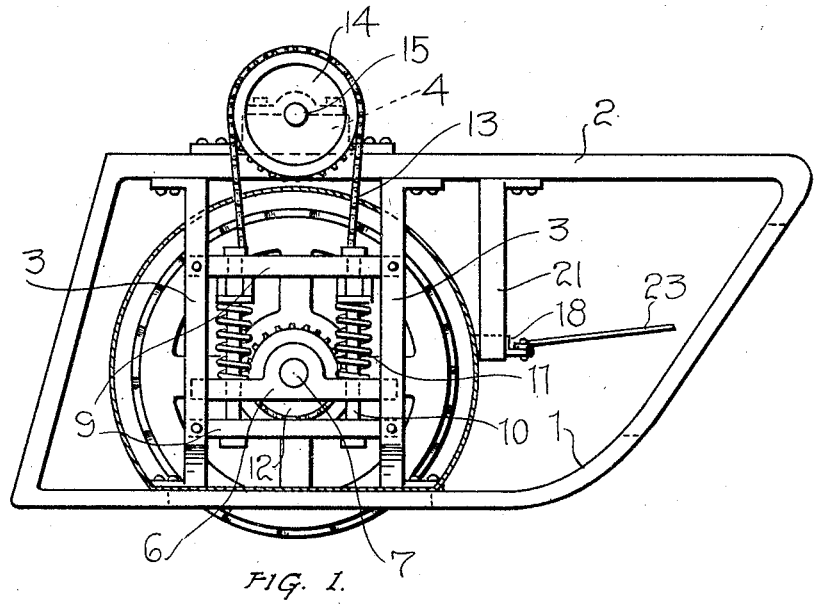
Figure 2:
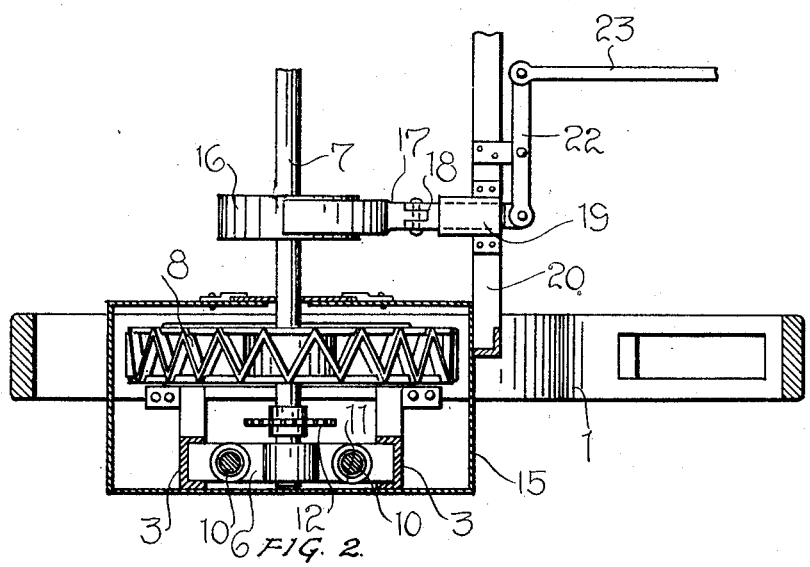

In the accompanying drawings forming a part of this application, Figure 1 is a side elevation of an attachment constructed in accordance with my invention and applicable to the rear axle of a vehicle. Fig. 2 is a horizontal section therethrough with parts in elevation.

In describing my invention, I shall refer to the drawings, in which similar reference characters designate corresponding parts throughout the several views and in which 1 indicates a runner, such as is usually provided in sleigh attachments, the front and rear portions thereof projecting upwardly and connected together by means of an upper longitudinal bar 2. The complete runner forms a frame or the like, the upper and lower longitudinal bars of which have secured thereto, a pair of spaced guide bars 3, portions of which are designed channel-shaped in cross section. These bars 3 as stated form guide bars for a purpose to be hereinafter and more particularly set forth and the same also act as a bracing means between said upper and lower longitudinal bars of the frame or runner. The upper longitudinal bar 2 of the runner or frame has a bearing 4 mounted thereon which is designed to rotatably receive the rear axle 5 of the vehicle therein.

Slidably mounted between the vertical channel-shaped guide bars 3, is an arm or the like 6 which is designed to form a bearing, rotatably receiving therein one end of a shaft or auxiliary axle 7. This auxiliary axle carries thereon the driving wheels 8, only one of the same being disclosed in the drawings, in view of the fact that but a section of the device is shown; and these driving wheels are of peculiar design in order to readily engage the snow covered surface for propelling the device as power is applied to the auxiliary axle or shaft 7.

Secured to the guide arms 3 above and below the shaft 7, are the transverse arms 9 through which are disposed a pair of rods 10, one of the latter being disposed forward and rearward of said shaft 7. These rods also extend loosely through openings in the movable arm 6 and encircling said rods between said arm 6 and the upper arm 9, are the coil springs 11, the normal tendency of which is to force downwardly on said arm 6 to permit the periphery of the wheel 8 to project below the lower longitudinal portion of the runner.

Mounted on the auxiliary axle or shaft 7, between the arm 6 and the wheel 8, is a sprocket 12, over which extends a link chain 13, the latter also extending over an additional sprocket 14 carried on the axle 5. It will thus be seen that as said axle 5 is rotated, the auxiliary axle or shaft 7 will also be rotated to cause the driving wheels 8 to be rotated to propel the device, it being, of course, understood that under the weight of the vehicle, said runners will be forced into contact with the surface of the ground against the tension of the springs 11. The springs 11 forcing downwardly on the driving wheels 8 will cause the latter to be constantly in frictional engagement with the surface of the ground whereby propulsion of the device is positive as the axle is rotated.

Mounted on the lower longitudinal bar of the runner, is a drum-like casing 15 which entirely incloses the driving wheel and the adjacent parts in connection therewith as can be clearly seen from Fig. 2 of the drawings. This drum-like housing prevents the snow and sleet from being splashed upwardly as the wheels are rotated and also acts as a covering for the actuating parts.

Mounted on the auxiliary shaft 7 is a brake-drum 16. A brake-shoe 17 is adapted to coöperate therewith, the same being pivotally carried on an angular arm 18 which is slidably received through a guide bearing 19. This guide bearing is carried, in turn, on a transverse bar 20 suspended from the upper longitudinal bars of the runners by means of the arms 21. The one end of the arm 18 is pivotally connected to a centrally fulcrumed lever 22 which is also carried on the projection of the bar 20, the opposite end of said fulcrumed lever having connection with an operating rod 23. The actuation of this rod 23 will, obviously, actuate the brake-shoe to its desired positions.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. In a sleigh attachment for vehicles, the combination with an axle; of a frame-like runner carried thereon, a pair of vertical spaced apart guide rails secured to the upper and lower portions of said runner and also forming supports therefor, an arm slidably mounted between said guide rails, a pair of transverse bars secured to said guide rails above and below said arm, guide rods loosely disposed through said movable arm and secured at their upper and lower ends to said upper and lower transverse bars, coil springs encircling said rods between the movable arm and the upper transverse bar to normally force said arm downwardly, means in connection with the upper transverse bar and said coil springs to adjust the tension of the latter, a drive wheel supported on said movable arm and adapted to normally project below the lower portion of said runner, means for rotating said drive wheel upon the rotation of the axle, and a drum-like shield secured to the runner and inclosing said drive wheel, guide rods and adjunctive parts.

2. In a sleigh attachment for vehicles, the combination with an axle; of a frame-like runner carried thereon, a pair of guide rails secured to the upper and lower portions of said runner in spaced relation to one another and forming supports therefor, said guide rails being offset intermediate of their ends to project in a plane outside of the vertical plane of said runner, an arm slidably mounted between said guide rails, a pair of transverse bars rigidly secured to said guide rails, respectively, above and below said arm, guide rods secured stationarily at their upper and lower ends to the transverse bars, externally threaded sleeve members carried by the upper transverse bar and receiving said guide rods therethrough, internally threaded cup-shaped members loosely applied on said guide rods and engaged with the externally threaded sleeves, coil springs encircling said guide rods between the slidable arm and said guide members to normally force the slidable arm downwardly, said sleeves and cup-shaped members affording a means for the adjustment of the tension of said springs, a drive wheel rotatably supported on said arm and adapted to normally project below the lower portion of said runner, means for rotating said drive wheel upon the rotation of the axle, and a drum-like shield secured to the runner inclosing said drive wheel, guide rods and adjunctive parts.

In testimony whereof I hereunto affix my signature in the presence of two witnesses.

CLYDE D. HARRIS.

Witnesses:
J. D. ROBERTS,
ELLA R. SHARP.